July 2, 1935.  J. R. HAINES  2,007,084
PROVING SWITCH FOR FORWARD AND REAR MOTOR VEHICLE SIGNALS
Filed March 25, 1932  2 Sheets-Sheet 1
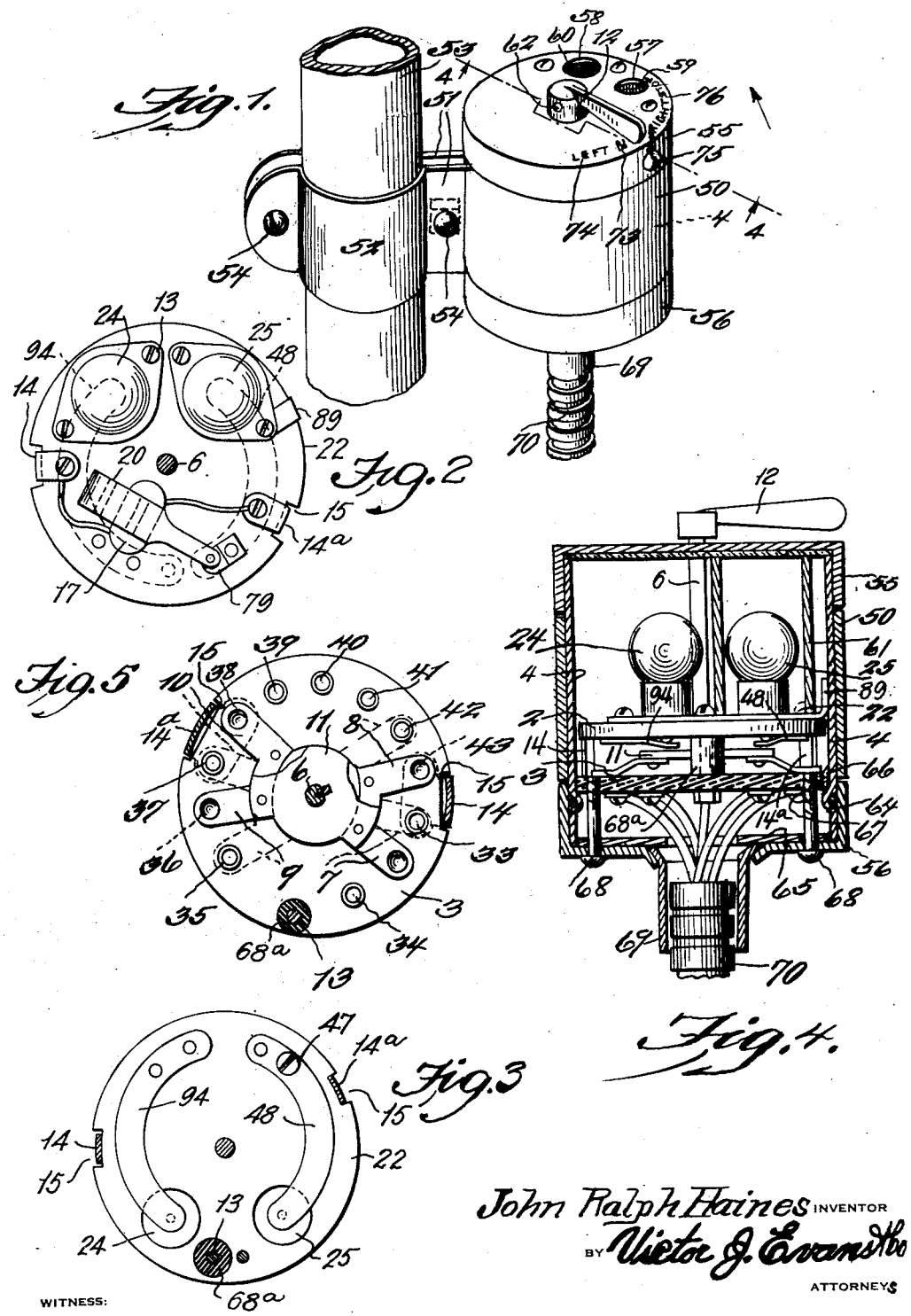
John Ralph Haines INVENTOR
BY Victor J. Evans &co
ATTORNEYS
WITNESS:

July 2, 1935.  J. R. HAINES  2,007,084
PROVING SWITCH FOR FORWARD AND REAR MOTOR VEHICLE SIGNALS
Filed March 25, 1932    2 Sheets-Sheet 2
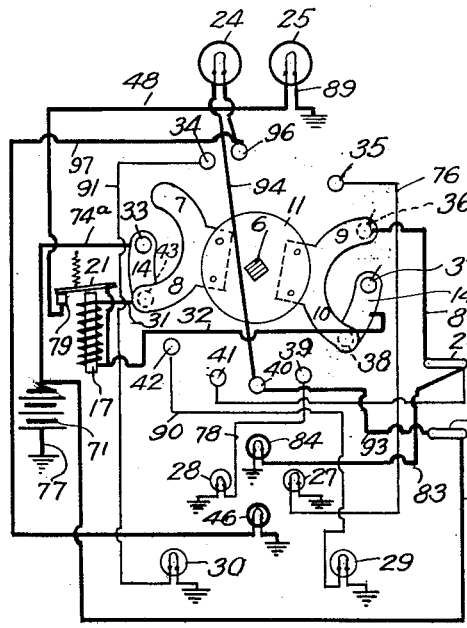
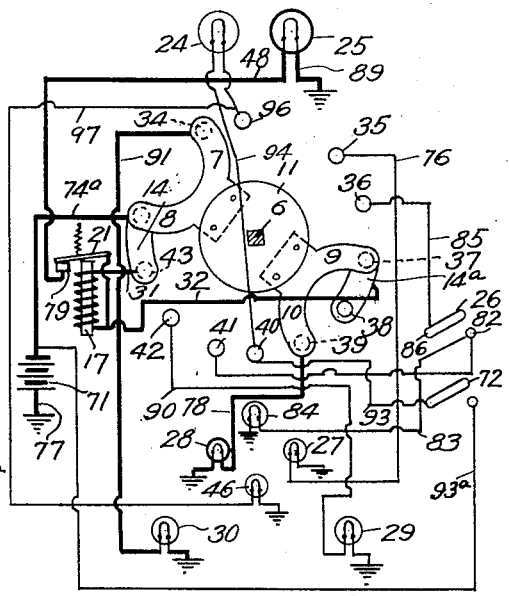
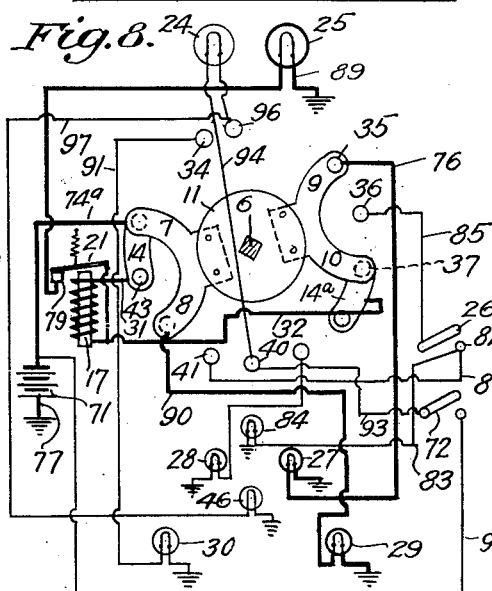
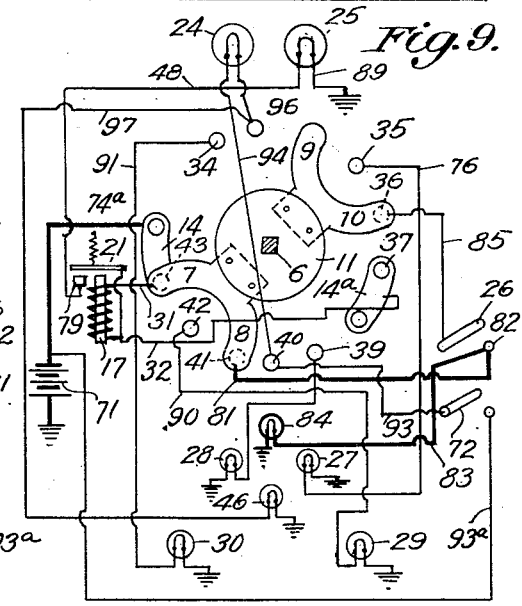
John Ralph Haines
INVENTOR
BY Victor J. Evans & Co.
ATTORNEYS Patented July 2, 1935

2,007,084

UNITED STATES PATENT OFFICE 2,007,084

PROVING SWITCH FOR FORWARD AND REAR MOTOR VEHICLE SIGNALS

John Ralph Haines, Tabernacle, N. J.

Application March 25, 1932, Serial No. 601,279

2 Claims. (Cl. 177—337)

The present invention relates to an improved proving switch with wiring system for use in connection with forward and rear motor vehicle signals.

With this signal, it is the aim to give notice when it is intended that the vehicle shall turn to the right or to the left, stop or back, and at the same time to indicate to a crossing policeman or a pedestrian that it is the intention to make a right or a left turn, it being a purpose to provide in connection with this signal a proving switch, which when operated, will indicate whether or not the various signals operate, the proving switch to be carried by the steering column making it easily operable by the operator or chauffeur.

Another purpose is to provide, in connection with the switch an auxiliary switch operable by the brake pedal of the automobile for actuating the stop or backing light, the first switch including means for proving that the stop or backing signal is lighted, when the brake pedal is operated.

Still another purpose is to provide, in a signal of this kind, an improved switch comprising fiber disks, one having a plurality of stationary terminal contacts, with radial movable contact arms to cooperate with the terminal contacts, for operating certain circuits, in order to actuate the right or left signals, as well as the stop and backing signals, and including signal light bulbs, and an electromagnet controlled switch element, for so controlling the circuit as to indicate and prove all the signals.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view in perspective of the improved proving switch constructed in accordance with the invention.

Figure 2 is a top plan view of the switch mechanism removed from the casing, the shaft 6 being shown in section.

Figure 3 is a transverse sectional view looking at the under side of the upper disc comprised in the switch mechanism.

Figure 4 is a sectional view on the plane indicated by the line 4—4 of Figure 1.

Figure 5 is a transverse sectional view looking at the top of the lower disc comprised in the switch.

Figure 6 is a diagrammatic view of the wiring system in which the switch is used, the switch being shown in neutral position.

Figure 7 is a view similar to Figure 6 but showing the switch in position for signalling for a left-hand turn.

Figure 8 is a similar view but showing the switch in the position for signalling for a right-hand turn.

Figure 9 is a similar view but showing the switch in the position where the stop light is converted into a backing light.

The switch comprises the discs 2 and 3, which are made from any suitable insulating material, such as a hard fibre material, such as Bakelite or the like. These two discs are designed to be mounted in a casing 4, provided with a cover, the casing being carried by a bracket, which in turn may be secured to the steering column as shown.

Mounted in the discs 2 and 3 and to rotate therein is a shaft or rod 6, which is provided with radial arms 7 and 8, and 9 and 10. The fact is the arms 7 and 8, and 9 and 10 are carried by a disc of insulating material such as fibre or the like 11, which is keyed or otherwise fastened to the rod or shaft 6. A handle 12 is carried by the rod or shaft 6 for the purpose of rotating the same.

The two discs are secured together rigidly, not only by means of the screw 13, surrounded by a spacer 68a but also by means of the contact plates 14 and 14a. The contact plates 14 and 14a are seated in recesses 15 in the discs, as more clearly shown in Figures 2, 3 and 5 of the drawings.

Supported in any suitable manner on the disc 2, is an electromagnet 17 carrying an armature 21, and it is attracted by the magnet when the brake pedal switch is actuated, or when the switch is shifted into either of its signalling positions. The disc 2 has sockets 22 and 23, in which the light bulbs 24 and 25 are mounted. The bulb 25 in circuit with the electromagnet and in circuit with the brake pedal switch 26, so that when the brake pedal is operated, the bulb 25 is lighted, proving to the chauffeur or driver that the stop and backing signals are operated.

Furthermore as is shown by the wiring diagrams in Figures 6 to 9, the bulb 25 is also in circuit with certain of the switch arms 7 and 8 and 9 and 10, so that when the switch rod or shaft is rotated in a direction to cause certain of the arms 7, 8, 9 and 10 to engage with certain terminal contacts of the disk 3, the bulb 25 will light, to prove that the right and left signals 27 and 28, as well as the front right and left fender lamps 29 and 30 are lighted.

The electro-magnet is in circuit with the conductor plates 14 and 14a by wires or leads 31 and 32.

The disc 3 on its inner face is provided with a plurality of terminal contacts 33, 34, 35, 36, 37, 38, 39, 40, 41, 42 and 43.

Fastened at contact 40 to the under face of the disc 2 is a spring arm 94, which is of curved formation with its terminal contact 45 engaging with the terminal of the bulb 24, which is in the circuit with the right and left front fender lights, and lights when the running light switch is turned on, in order to prove to the driver or chauffeur that the fender lights are illuminated, as well as light the tail lamp 46.

Also secured at 47 to the disc 2 is a spring arm or blade 48, which is also curved, and its terminal engages with the terminal of the lamp or bulb 25. This spring arm is electrically connected with the contact 79 forming one of the elements of the circuit closer of which the armature 21 is the other.

The switch including discs 2 and 3 is housed in the casing 4, as previously stated, and surrounding the casing is a band 50, the end portions 51 of which are curved as shown at 52 to engage about a steering column 53, there being screws and nuts 54 for holding the end portions in clamping engagement with the column 53. The tightening of the screws 54 insures a tight engagement of the band 50 about the casing and about the steering column.

Covers 55 and 56 are provided for the casing 4. Cover 55 has window lights 57 and 58, the former being covered with a red transparency 59, while the latter is covered with a green transparency 60.

Carried by the cover 55 is a cylindrical shield 61, which surrounds the bulb 25, the light from which is visible through the red transparency 59. The cover 55 is held on the casing 4 partly by friction, and also by the handle 12, which is secured to the shaft or rod 6 by means of a screw 62.

The two discs 2 and 3 of the switch fit down into the casing 4, the disk 3 resting upon nubs or indentures 64, thereby preventing the discs from engaging close to the bottom of the casing 4. In fact, the nubs 64 act to space the lower discs 63 from the bottom cover 56. Resting on the interior of the bottom cover 56 is a relatively thin fiber disk 65, which acts to prevent the wires to the various terminals from engaging with the metal and thereby preventing short circuit. An additional nub 66 is formed in the wall of the casing 4 and engages into a notch 67 in the disk 3, thereby preventing rotation of the disk as well as preventing rotation of the entire switch structure. Suitable screws 68 engage through the bottom cover 56 and are threaded to the disc 3, thereby holding the switch structure against upward movement, and at the same time holding the bottom cover 56 on the casing 4. Carried by the bottom cover 56 is a tubular extension 69, into which a flexible cable or tubing 70 is fastened in any suitable manner, possibly by soldering or the like. The flexible tubing or cable is provided for the purpose of receiving the various wiring disclosed in the wire diagrams in Figures 6 to 9, and which are in turn connected to the various terminals of the switch structure.

The wire diagram in Figure 3 includes a battery 71 and a conventional type of headlight switch 72. A ground connection in the switch is effected by means of a resilient strip 89 electrically connected with the socket 23 and bearing against the inner wall of the casing 4.

The operation of the invention is as follows:

When the switch is in neutral position the handle 12 is over the letter N and the movable contact members 9 and 10 bridge the contacts 36 and 38, the arm 8 of the other movable contact member bearing upon the contact 43. In this position, current flows from the battery 71 over the conductor 74a to the plate 14, thence through the magnet 17 over the conductor 31 and from the magnet over the conductor 32 to the plate 14a, thence across the movable contact arms 10—9, the conductor 85 to the switch 26. This switch is normally open but when the brake is applied it is brought to closed position and current, having reached the switch, then flows over the conductor 83 and through the stop light 84 to the ground, returning to the battery over the cable 77 by which the battery is grounded. When the switch is open, however, there will be no current flowing in the circuit just above described but upon closing the switch and energizing the magnet 17, its armature 21 will be attracted and will engage the contact 79. The armature 21 is connected in on the conductor 32 and current which has passed through the magnet divides, a part passing over the armature 21 to the contact 79 and thence over the strip 48 to the proving light 25 and thence to the ground and back to the battery. Thus every time the switch 26 is closed, the magnet functions to actuate its armature and close the circuit on the proving light 25.

But the tail-light and its proving light 24 are in an independent circuit, no matter what the position of the switch parts. When the switch 72 is closed, this switch being the running light switch, current flows from the battery 71 over the conductor 93a to the switch 72a, thence over the conductor 93 to the contact 40 and thence over the arcuate strip 94 to the proving light 24, thence through the proving light and over the conductor 97 to the tail-light 46, thence to the ground and back to the battery. As long as the switch 72 is closed, therefore, the tail-light and its proving light 24 are illuminated.

When it is desired to make a left-hand turn, the switch handle 12 is moved down to stand over the word "Left", when the movable contacts 7—8 and 9—10 bridge the contacts 34 and 33 and 37 and 39 respectively. Then current flows from the battery 71 over the conductor 74a to the contact 33, the plate 14, the conductor 31, the magnet 17, the conductor 32, the plate 14a, the movable contact 9—10, the conductor 78, through the left-hand indicating signal 28 and thence back to the battery. But the light 28 is the rear signalling light and the switch provides also for energizing the forward signalling light 30. The current which reaches the plate 14, passes over the arms 8—7 and the conductor 91 to the light 30 and thence back to the battery through the ground connections. In this position, the magnet 17 being energized, its armature will be attracted and the proving light 25 will be energized to show operation of the left-hand signal. But in this position, the stop light 84 is rendered inert, because its actuating switch 26 is connected in on the contact 36 which, in the indicated position of the signalling switch member, is dead.

When a right-hand turn is to be made, the switch handle 12 is moved to a position over the word "Right", thus causing the movable contacts 7—8 and 9—10 to respectively bridge the contacts 40 and 33 and 35 and 37 which provides for current flow from the battery 71 through the magnet 17 as previously described to the plate 14a, thence over the contact arms 10—9, the conductor 76, the rear right-hand signal 27 and back to the battery through the ground connection. The forward right-hand signal 29 is energized by current which, after reaching the plate 14, passes over the movable contact member 7—8 and over the conductor 90 to the light, returning to the battery through the ground connections. Since the contact 36 is unengaged in this position of the switch elements, the stop light 24 is rendered inert.

When the switch actuating handle is shifted to a position over the word "Stop", the movable contact member 7—8 bridges the contacts 31 and 41 and the arm 10 of the movable contact 9—10 engages the contact 36, but, engaging no other contact, the contact 36 is left dead in this position, so that the switch 26 will perform no function. In this position of the switch mechanism, current will flow from the battery 71 over the conductor 74a to the plate 14 and thence over the arms 7 and 8 of the movable contact to the contact 41 and thence over the conductor 81 to one side of the switch 82 and thence over the conductor 83 to the light 84. In this position of the signalling switch, the stop light switch is shunted and the stop light becomes permanently lighted to function as a backing light. The magnet 17 is unenergized in this position of the switch mechanism, so that the proving light 25 does not function but, in the normal or neutral position of the switch mechanism, the proving light functions when the stop light is operated, so that the vehicle having been stopped prior to backing, the light 25 proves the operation of the light 84, so that when it is converted into a backing light, it is known from the operation in stopping, that the light is active as a backing light.

The invention having been set forth what is claimed is:

1. In an electric signalling system for motor vehicles, the combination with right and left direction indicating signals and stop signal and energizing means therefor, the stop signal having a brake pedal actuated switch, of a switch mechanism for selectively controlling the right and left indicating signals and for shunting the stop signal switch to convert the stop signal into a continuously lighted backing signal.

2. In an electric signalling system for motor vehicles, the combination with right and left direction indicating signals and stop signal and energizing means therefor, the stop signal having a brake pedal actuated switch, of a switch mechanism for selectively controlling the right and left indicating signals and for shunting the stop signal switch to a signal proving means, and means for rendering the proving means active in either of the direction indicating positions of said switch mechanism or when said stop signal is operative as such.

JOHN RALPH HAINES.